(12) United States Patent
Rogers

(10) Patent No.: US 11,602,140 B2
(45) Date of Patent: Mar. 14, 2023

(54) SMART FISHING ROD DEVICE

(71) Applicant: April Rogers, Gainsville, GA (US)

(72) Inventor: April Rogers, Gainsville, GA (US)

( * ) Notice: Subject to any disclaimer, the term of this patent is extended or adjusted under 35 U.S.C. 154(b) by 350 days.

(21) Appl. No.: 14/866,857

(22) Filed: Sep. 26, 2015

(65) Prior Publication Data

US 2017/0086443 A1 Mar. 30, 2017

(51) Int. Cl.
*A01K 97/12* (2006.01)
*H04W 4/80* (2018.01)

(52) U.S. Cl.
CPC ............. *A01K 97/125* (2013.01); *H04W 4/80* (2018.02)

(58) Field of Classification Search
CPC ...... A01K 97/125; A01K 97/00; A01K 93/02; A01K 97/12; A01K 91/06; A01K 93/00; A01K 99/00; A01K 85/01; A01K 87/007; A01K 87/00; A01K 97/01
USPC .............................................................. 43/17
See application file for complete search history.

(56) References Cited

U.S. PATENT DOCUMENTS

| | | | | |
|---|---|---|---|---|
| 4,422,258 A * | 12/1983 | Adams | ................. | A01K 97/125 177/245 |
| 5,782,033 A * | 7/1998 | Park | ..................... | A01K 97/125 43/17 |
| 5,867,931 A * | 2/1999 | Morris | ................. | A01K 97/125 43/17 |
| 7,109,870 B1 * | 9/2006 | Reed | ..................... | A01K 97/125 340/573.1 |
| 7,562,488 B1 * | 7/2009 | Perkins | ................ | A01K 87/007 43/17 |
| 8,896,450 B1 * | 11/2014 | Overbye | .............. | A01K 97/125 340/573.2 |
| 9,609,856 B1 * | 4/2017 | Little | .................... | A01K 97/125 |
| 2002/0056221 A1 * | 5/2002 | Radosavljevic | ..... | A01K 87/007 43/17 |
| 2009/0158635 A1 * | 6/2009 | Hope | ................... | A01K 97/125 43/4.5 |
| 2011/0213570 A1 * | 9/2011 | Rayor | .................. | A01K 87/007 702/42 |
| 2016/0353725 A1 * | 12/2016 | Worley, III | .......... | A01K 87/007 |

* cited by examiner

*Primary Examiner* — Peter M Poon
*Assistant Examiner* — Jeffrey R Larsen
(74) *Attorney, Agent, or Firm* — Patent Negotiator, PLLC; Sarita Pickett

(57) ABSTRACT

A smart fishing rod device that fits on the tip of any fishing rod. The line passes through the device, and the device senses tension on the line. A processor in the device is configured to interpret increases in tension as the presence of fish. The device can signal wirelessly to a smart device that there is a fish present. The device can also have one or more LEDs that flashes when a fish is present. The smart device can run an application (APP) that displays or signals the presence of a fish on one or more rods equipped with the device.

10 Claims, 4 Drawing Sheets

SMART FISHING ROD DEVICE

BACKGROUND

Field of the Invention

The present invention relates generally to fishing accessories and more particularly to a smart fishing rod device that notifies wirelessly when a fish creates tension on the line.

Description of the Problem Solved

Fishermen many times set several rods while they fish. The various rods may be of different sizes and have different bait, or they may all be the same. It becomes difficult to tend multiple rods (or even one rod for that matter). The reason for this, is many times it is impossible to know when a fish is toying with the bait without holding the rod and feeling the fish. Usually a fisherman, though experience, pulls the rod to set the hook at exactly the right time. However, if the rod is unattended, the fisherman can only see when the tip of the rod is moving. This usually means that a fish has taken the bait. However, when the fish is simply toying the bait, the movement may be to slight to notice. It would be advantageous to have a smart fishing rod device that would fit on any rod to alert the fisherman when there is an increase in tension on the line.

SUMMARY OF THE INVENTION

The present invention relates to a smart rod independent device (SRID) that is aimed at fishermen who enjoy having more technical elements in their fishing experience. The device attaches to the tip of any fishing pole. The line is passed through the device over a spring-loaded sliding pin or other mechanism by opening a cover or closure. When the cover is closed, the line rests on the pin. Under the pin is a tension monitoring sensor or simply an electrical contact that can communicate with a processor to determine when a fish is exerting tension on the line (either by toying with the bait, or by actually taking the bait). A processor program can be configured to sense varying tensions. The weight or tension sensor can then be monitored continuously to determine when to send a fish-present signal. The processor can communicate wirelessly directly with a smart device, or communicate with wireless transceiver or wireless hub. The smart device can display a message to the user showing which rod is feeling tension. A dedicated application (APP) in the smart device can cause a special ring and/or display on the device indicating a hit. Different rings or displays can indicate different rods if multiple rods are in use. The device can also be equipped with one or more LEDs that flash. Different devices can have different colored LEDs to distinguish rods and/or bait.

DESCRIPTION OF THE FIGURES

Attention is now directed to several drawings that illustrate features of the present invention.

Several drawings and illustrations have been presented to aid in understanding the present invention. The scope of the present invention is not limited to what is shown in the figures.

DESCRIPTION OF THE PREFERRED EMBODIMENT

Figure 1:
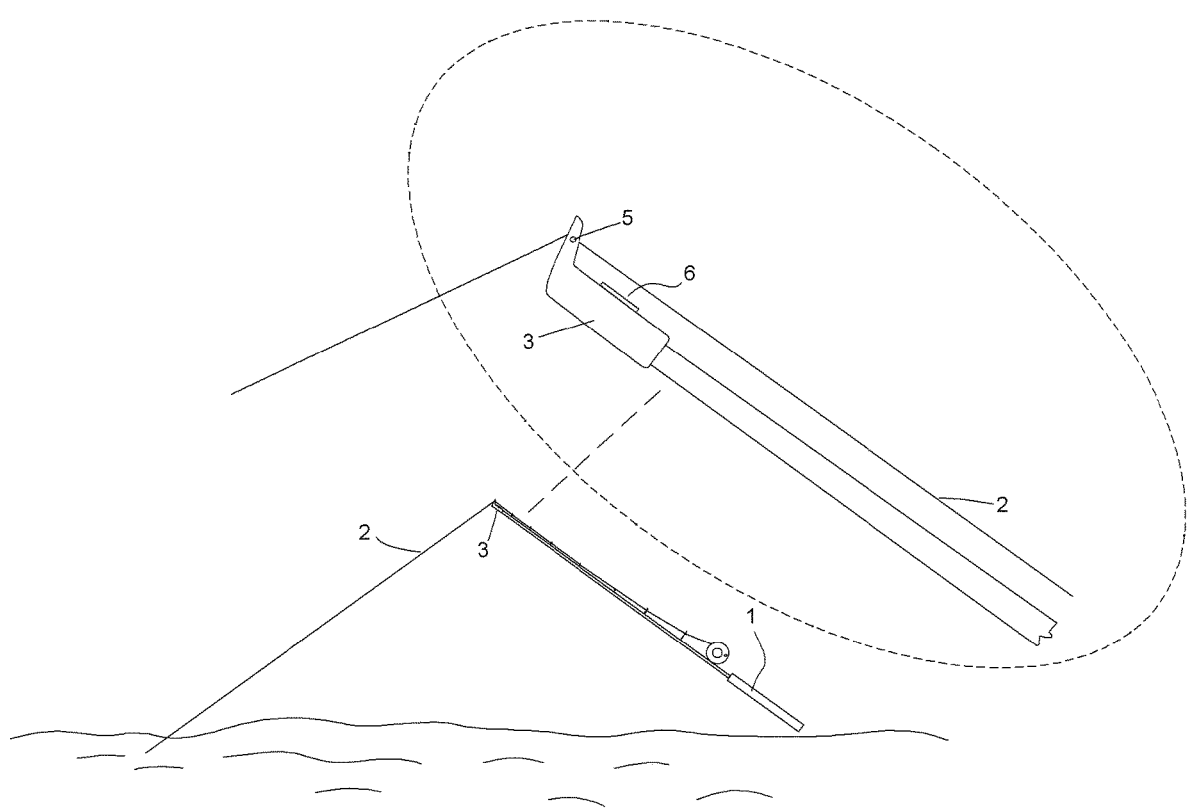
FIG. 1 shows an embodiment of the present invention mounted on the tip of a fishing rod.

The present invention relates to a smart rod independent fishing device (SRID) which includes a removable tip that can be attached to any fishing rod. FIG. 1 shows how the device is attached. A rod 1 has typical line 2 that passes through the present invention 3 which is mounted on the end of the rod 1. The SRID device 3 has a processor 6 (which is shown external to the device in FIG. 1, but may be internal). The device 3 also has a pin or other spring-loaded mechanism that is configured so that the line 2 passes over it. The device 3 can also have a gate that closes its opening so that the line cannot come out.

Figure 2:
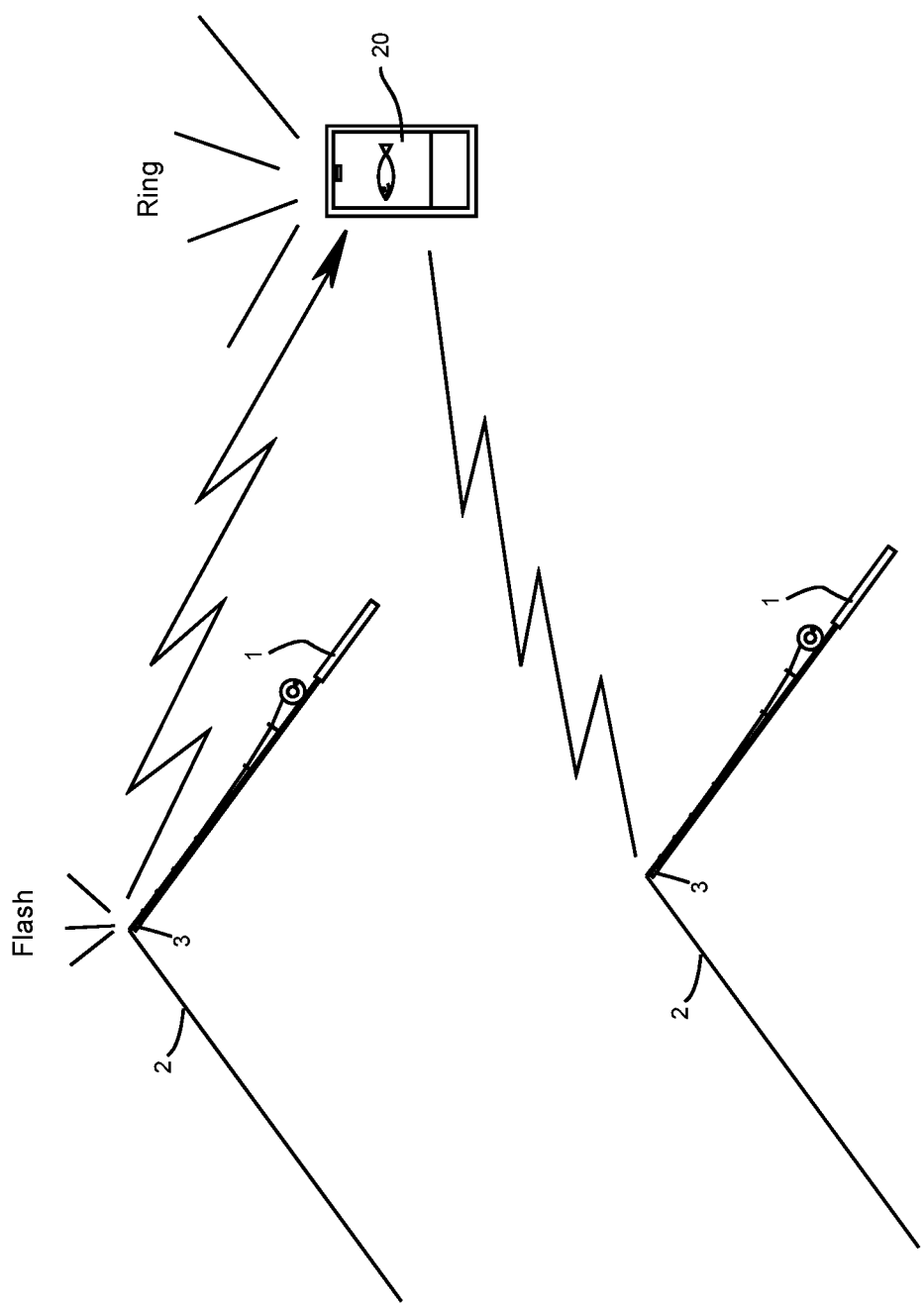
FIG. 2 shows two of the devices communicating with a smartphone.

FIG. 2 shows two of the SRID devices 3, 3' on the tip of rods 1, 1' communicating wirelessly with a smart device 20 such as a smartphone. Communication allows the device 3 to alert the smart device 20 to ring, beep, show a special display 26, or otherwise announce the presence of a fish 25 on a particular rod 1. The SRID devices 3, 3' can also be equipped with one or more LEDs that flash or light when a fish 25 is detected. This is particularly useful when multiple rods 1, 1' and bait are being used as shown.

Figure 3:
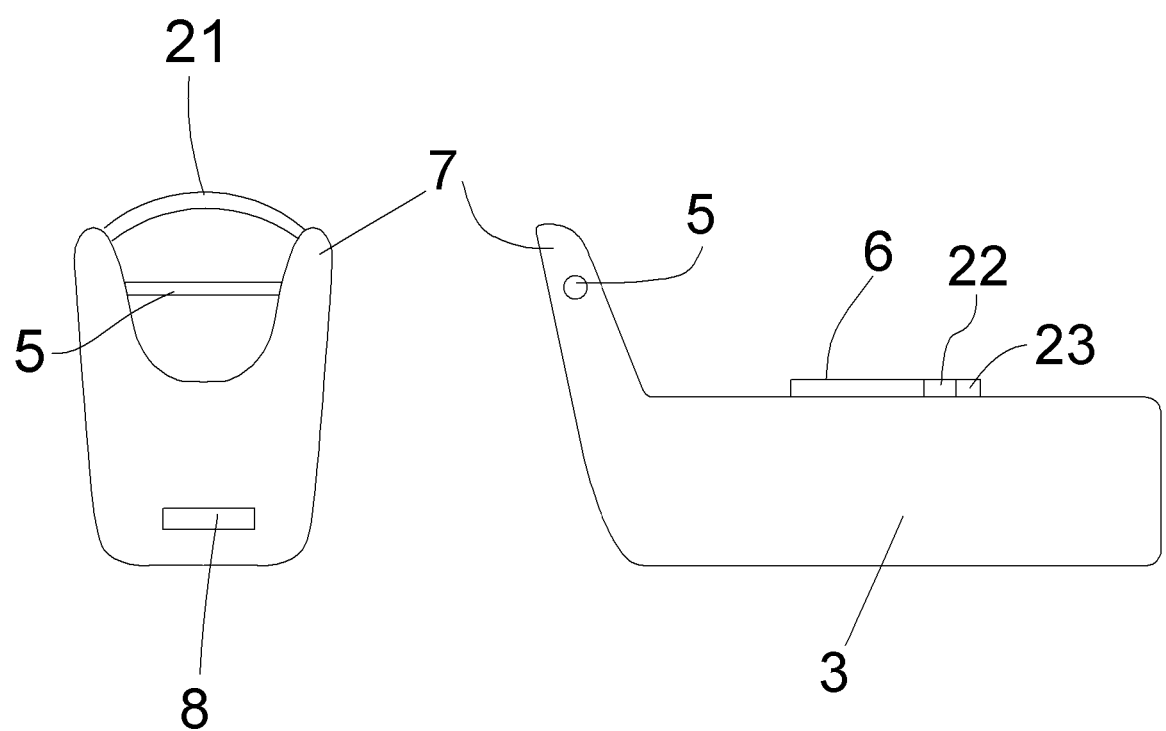
FIG. 3 shows a front and side view of an embodiment of the invention.

FIG. 3 shows a front and side view of an embodiment of the present invention. The SRID device 3 has a sliding pin 5 that carries the line. While a pin is preferred, any mechanism that can move as a line takes more tension is within the scope of the present invention. The device 3 has as raised tips 7 that act as a convention rod tip to guide the line. A gate 21 can close the device so the line does not escape. A battery charging port 8 can be located anywhere on the device 3. This can be a standard universal serial bus USB charging port, or it can be a special charging port. This port 8 is typically used to charge the battery before fishing begins.

FIG. 3 also shows that the device is equipped with a processor 6. This can be any controller, or microprocessor known in the art. Either internal or external to this processor 6 is memory 22 that can contain stored computer instructions for the processor to execute and can store data. The processor can be connected to a communication module 23.

Figure 4:
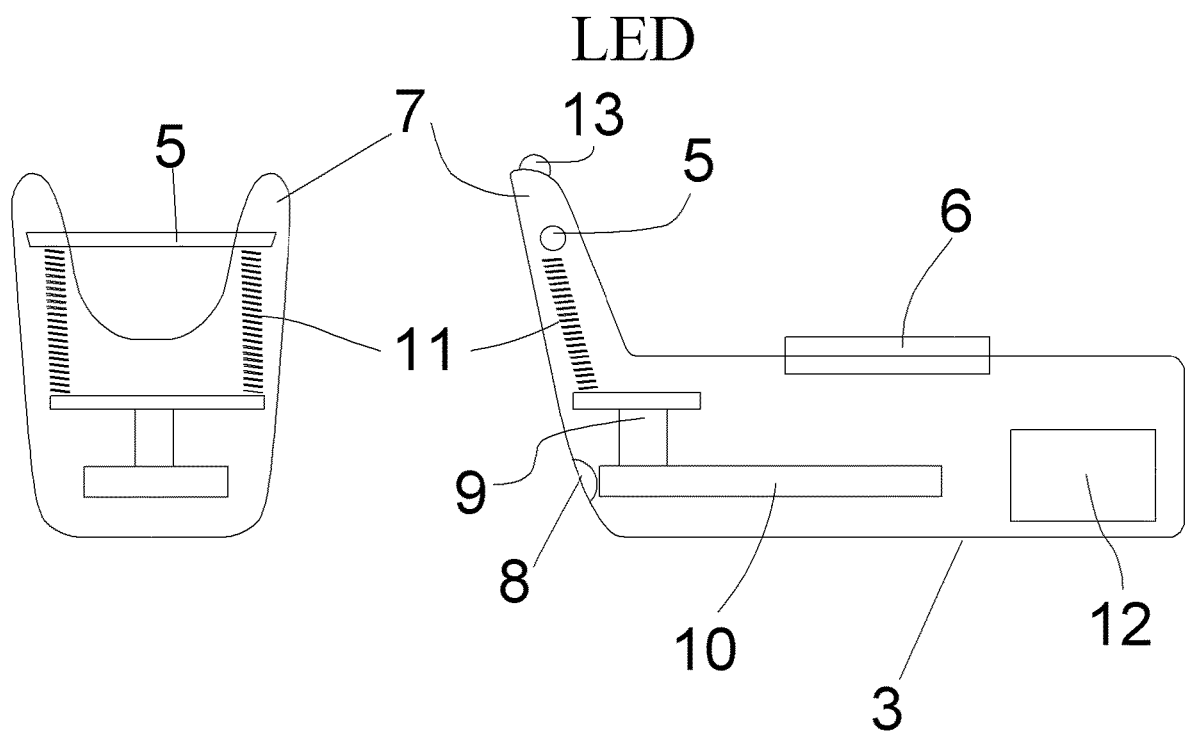
FIG. 4 shows an internal view of the embodiment of FIG. 3.

FIG. 4 shows one example of the internal structure of an embodiment of the present invention. The pin 5 is spring-loaded with one or more light springs 11. The springs can press down on a weight or pressure sensor 9. The sensor 9 is controlled by the processor 6 (which as stated above may be entirely internal to the device 3). A battery 10 powers the sensor, processor and a communication module 12. The battery can be a miniature battery known in the art. It can also be a telephone battery. The battery can optionally be charged through the charging port 8 as previously described. In other embodiments, the battery is not recharged, but simply replaced periodically. A preferred charging port is a miniature USB port known in the art. It should be noted that while the preferred technique is to use a processor that executes instructions stored in memory, any processor or processing technique can be used including an analog processor or a hardwired analog circuit. In a simpler embodiment, the sensor can be directly connected to the communication module with no processor to simply send a signal to a remote station or handheld device when the sensor senses an increase in tension on the fishing line.

The communication module 12 can communicate either using short-range communications such as that know under the name BLUETOOTH™, or it can communication using techniques such as WiFi, or even cellular telephone or infrared light communication. In an alternate embodiment, the SRID device contains a micro-cellular telephone. The method of communication can use any protocol or any communication technique. A preferred protocol is known as Internet Protocol or IP. This can be used with short-range communication like BLUETOOTH™ or WiFi or with cellular techniques, or for communication over the Internet. Any protocol is within the scope of the present invention. Also any physical wireless technique is within the scope of the present invention with low power Radio Frequency (RF) techniques being preferred. If a radio wireless technique is used, a small RF antenna (not shown) connects to the communication module 12. The communication can be directly with a smart device, or it can be into routers, switches, hubs or into any network including the Internet.

FIG. 4 also shows optional LED 13. This LED is under control of the processor 6 and can be used to visually signal when a fish is putting tension on the line. Different devices 3 can be equipped with different colored LEDs 13. to distinguish between different rods or bait. One embodiment of the present invention has only the LEDs and no wireless communication. This version achieves minimum battery usage.

The SRID device has a housing that can be waterproof and secure to ensure that a fisherman will never sling or throw the device off when casting or placing a rod in a rod holder. The processor and communication module is very light weight and can be configured to execute applications (apps) that can be downloaded to it wirelessly or programmed in through the USB port. Also, the processor and communication module use minimum battery power to assure hours of use between charges or battery change outs.

An application (app) can be downloadable to a smartphone or other handheld device to receive the signal from the SRID device and display and/or alarm when tension has increased on the fishing line. A single smartphone, can pair using BLUETOOTH™ with several different fishing rods, and signal which rod has seen an increase in tension. In some embodiments, the SRID device can sense the amount of tension increase and transmit that as well as the simple fact that tension has increased. The remote smartphone can display different colors or other indicators of the amount of tension changes in a given fishing line.

The device solves the problem of unattended fishing rods, and can be used night or day.

Several descriptions and illustrations have been presented to aid in understanding the present invention. One with skill in the art will realize that numerous changes and variations may be made without departing from the spirit of the invention. Each of these changes and variations is within the scope of the present invention.

I claim:

1. A plurality of smart fishing rod devices capable of communicating with a remote device, and each of the plurality of smart fishing rod devices being capable of engaging a respective one of a plurality of fishing rods, each fishing rod of the plurality of fishing rods having an end having a handle affixed thereto, and a tip opposite the end, and a fishing line extending from the end to the tip; each smart fishing rod device of the plurality of smart fishing rod devices comprising:
   a housing releasably attachable to the tip of the fishing rod, the housing including:
      a single force sensor adapted to sense tension on the fishing line;
      a processor executing stored instructions connected to the force sensor, the processor producing an electrical signal when tension on the fishing line increases; and
      a wireless radio communication module connected to the processor configured to respond to the electrical signal and to send a wireless message to the remote device indicating an increase in tension in the fishing line, the wireless message also including information as to which of the plurality of fishing rods the wireless message is attached to;
   wherein, the remote device, upon receiving said wireless message indicates that a fish is on the fishing line of one of the plurality of fishing rods and indicates which fishing rod transmitted said wireless message; and
   wherein the housing is releasably attachable to the tip of the fishing rod is waterproof.

2. The plurality of smart fishing rod devices of claim 1, wherein the processor of each smart fishing rod device executes stored instructions from a memory, wherein the processor and memory are located within the housing.

3. The plurality of smart fishing rod devices of claim 2 wherein the processor of each smart fishing rod device is configured to determine a threshold level of force indicating that the fish is on the fishing line.

4. The plurality of smart fishing rod devices of claim 3 further comprising a plurality of LEDs, wherein at least one LED is mounted on the housing of each smart fishing rod device, the at least one LED configured to light when the processor recognizes said increase in tension on the fishing line.

5. The plurality of smart fishing rod devices of claim 4 wherein a first LED of the plurality of LEDs which is mounted on the housing of a first smart fishing rod device of the plurality of smart fishing rod devices displays a different color than a second LED which is mounted on the housing of a second smart fishing rod device of the plurality of smart fishing rod devices.

6. The plurality of smart fishing rod devices of claim 1 wherein the wireless radio communication module of each smart fishing rod device uses BLUETOOTH™.

7. The plurality of smart fishing rod devices of claim 1 wherein the wireless radio communication module of each smart fishing rod device uses WiFi.

8. The plurality of smart fishing rod devices of claim 1 wherein the wireless radio communication module of each smart fishing rod device uses cellular telephone technology.

9. The plurality of smart fishing rod devices of claim 1 wherein the remote device is a handheld telephone.

10. The plurality of smart fishing rod devices of claim 1 wherein the single force sensor further comprises a pressure sensor and a spring which presses down on the pressure sensor in response to tension on the fishing line.

* * * * *